(12) United States Patent
Boyer et al.

(10) Patent No.: US 9,495,648 B1
(45) Date of Patent: Nov. 15, 2016

(54) TRAINING A SIMILAR PASSAGE COGNITIVE SYSTEM USING GROUND TRUTH FROM A QUESTION ANSWERING COGNITIVE SYSTEM

(71) Applicant: International Business Machines Corporation, Armonk, NY (US)

(72) Inventors: John M. Boyer, Victoria (CA); Kshitij P. Fadnis, Dublin, OH (US); Collin J. Murray, Lynnfield, MA (US); Justin A. Ziniel, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/966,603

(22) Filed: Dec. 11, 2015

(51) Int. Cl.
*G06F 17/00* (2006.01)
*G06F 17/20* (2006.01)
*G06N 99/00* (2010.01)
*G06N 7/00* (2006.01)

(52) U.S. Cl.
CPC ............ *G06N 99/005* (2013.01); *G06N 7/005* (2013.01)

(58) Field of Classification Search
USPC .......................................................... 706/11
See application file for complete search history.

(56) References Cited

U.S. PATENT DOCUMENTS

| | | | | |
|---|---|---|---|---|
| 7,975,143 B2* | 7/2011 | Boyer | ...................... | G06F 21/64 713/176 |
| 7,995,568 B2* | 8/2011 | Boyer | ....................... | G06F 8/31 370/359 |
| 8,538,684 B2* | 9/2013 | Boyer | ................ | G01C 21/3461 701/416 |
| 8,572,751 B2* | 10/2013 | Boyer | ...................... | G06F 21/64 726/26 |
| 8,768,925 B2 | 7/2014 | Brown et al. | | |
| 8,856,532 B2* | 10/2014 | Boyer | ...................... | G06F 21/64 707/690 |
| 8,881,006 B2* | 11/2014 | Boyer | ................... | H04L 9/3236 715/268 |
| 9,015,104 B2* | 4/2015 | Boyer | ................. | G06F 17/2247 707/602 |
| 9,015,105 B2* | 4/2015 | Boyer | ................. | G06F 17/2247 707/602 |
| 9,223,760 B2* | 12/2015 | Boyer | ................... | G06F 17/212 |

(Continued)

OTHER PUBLICATIONS

Towards supporting psychologically plausible variability in agent-based human modelling E. Norling; F. E. Ritter Autonomous Agents and Multiagent Systems, 2004. AAMAS 2004. Proceedings of the Third International Joint Conference on Year: 2004 pp. 758-765 IEEE Conference Publications.*

(Continued)

*Primary Examiner* — Michael B Holmes
(74) *Attorney, Agent, or Firm* — Stephen R. Tkacs; Stephen J. Walder, Jr.; Diana R. Gerhardt (57) ABSTRACT

A mechanism is provided in a data processing system comprising at least one processor and a memory comprising instructions which, when executed by the at least one processor, causes the at least one processor to train a similar passage cognitive system. The mechanism receives a question and answer key for a question answering cognitive system, the question and answer key comprising a list of question and answer specification pairs. Each question is a text string and each answer specification references one or more text passages from a corpus of information. The mechanism uses the question and answer key to generate a similar passage map for the similar passage cognitive system, the similar passage map comprising a list of text relation pairs. Each text relation pair comprises a sample input text component and a list comprising one or more sample output text components. The mechanism trains a similar passage machine learning model of the similar passage cognitive system using the similar passage map.

21 Claims, 5 Drawing Sheets

(56) References Cited

U.S. PATENT DOCUMENTS

| | | | |
|---|---|---|---|
| 9,264,021 B1* | 2/2016 | Jarrar | H03K 3/0375 |
| 9,336,306 B2* | 5/2016 | McAteer et al. | G06F 17/30734 |
| 2009/0024606 A1 | 1/2009 | Schilit et al. | |
| 2009/0162824 A1 | 6/2009 | Heck | |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2011/0302117 A1 | 12/2011 | Pinckney et al. | |
| 2013/0007055 A1 | 1/2013 | Brown et al. | |
| 2013/0018652 A1 | 1/2013 | Ferrucci et al. | |
| 2013/0018876 A1 | 1/2013 | Chu-Carroll et al. | |
| 2013/0066886 A1 | 3/2013 | Bagchi et al. | |

OTHER PUBLICATIONS

Open domain question answering system using cognitive computing Ruby Bhati; S. S Prasad 2016 6th International Conference—Cloud System and Big Data Engineering (Confluence) Year: 2016 pp. 34-39, DOI: 10.1109/Confluence.2016.7508043 IEEE Conference Publications.*

Question Answering Search engine short review and road-map to future QA Search Engine Aniket D Kadam; Shashank D Joshi; Sachin V Shinde; Sampat P Medhane Electrical, Electronics, Signals, Communication and Optimization (EESCO), Intl. Conference on Year: 2015 pp. 1-8, DOI: 10.1109/EESCO.2015.7253949 IEEE Conference Publications.*

Infusion of cognitive engineering into systems engineering processes and practices A. M. Madni; A. P. Sage; C. C. Madni 2005 IEEE International Conference on Systems, Man and Cybernetics Year: 2005, vol. 1 pp. 960-965 vol. 1, DOI: 10.1109/ICSMC.2005.1571270 IEEE Conference Publications.*

"List of IBM Patents or Patent Applications Treated as Related", Feb. 8, 2016, 2 pages.

U.S. Appl. No. 14/139,589, filed Dec. 23, 2013.

U.S. Appl. No. 14/810,723, filed Jul. 28, 2015.

Bendersky, Michael et al., "Re-Ranking Search Results Using Document—Passage Graphs", SIGIR '08 The 31st Annual International ACM SIGIR Conference Singapore, Jul. 20-24, 2008, 2 pages.

High, Rob, "The Era of Cognitive Systems: An Inside Look at IBM Watson and How it Works", IBM Corporation, Redbooks, Dec. 12, 2012, 16 pages.

Li, Yuhua et al., "Sentence Similarity Based on Semantic Nets and Corpus Statistics", IEEE Transactions on Knowledge and Data Engineering, vol. 18, No. 8, Aug. 2006, 13 pages.

McCord, M.C. et al., "Deep parsing in Watson", IBM J. Res. & Dev. vol. 56 No. 3/4 Paper 3, May/Jul. 2012, pp. 3:1-3:15.

Roberts, Ian et al., "Evaluating Passage Retrieval Approaches for Question Answering", Advances in Information Retrieval, 26th European Conference on IR Research, ECIR 2004, Sunderland, UK, Apr. 5-7, 2004, 13 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

TRAINING A SIMILAR PASSAGE COGNITIVE SYSTEM USING GROUND TRUTH FROM A QUESTION ANSWERING COGNITIVE SYSTEM

BACKGROUND

The present application relates generally to an improved data processing apparatus and method and more specifically to mechanisms for training a similar passage cognitive system using a ground truth answer key from a question answering cognitive system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating question answering (QA) systems which may take an input question, analyze it, and return results indicative of the most probable answers to the input question. QA systems provide automated mechanisms for searching through a large corpus of information, i.e. large sets of sources of content such as electronic documents, and analyze the content with regard to an input question to determine answers to the question and a confidence measure per answer indicating the probability that it is a useful answer for the input question.

Examples, of QA systems are Siri® from Apple®, Cortana® from Microsoft®, and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

SUMMARY

In one illustrative embodiment, a method is provided in a data processing system comprising at least one processor and a memory comprising instructions which, when executed by the at least one processor, causes the at least one processor to train a similar passage cognitive system. The method comprises receiving a question and answer key for a question answering cognitive system. The question and answer key comprising a list of question and answer specification pairs. Each question is a text string and each answer specification references one or more text passages from a corpus of information. The method further comprises using the question and answer key to generate a similar passage map for the similar passage cognitive system, the similar passage map comprising a list of text relation pairs. Each text relation pair comprises a sample input text component and a list comprising one or more sample output text components. The method further comprises training a similar passage machine learning model of the similar passage cognitive system using the similar passage map.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for training a similar passage cognitive system using a ground truth answer key from a question answering cognitive system. A cognitive similar passage system, or SP system, is defined here to be a computer system that receives a passage in natural language or query format and returns passages that are similar to the input passage and that are extracted from a corpus of information such as natural language documents.

An SP system is a cognitive system operating in accordance with a similar passage machine learning model. A subject matter expert (SME) initially provides ground truth in the form of a similar passage map, which comprises similar passage map comprising a list of text relation pairs. Each text relation pair consists of a sample input text component and a list comprising one or more sample output text components that are similar to the sample input text component. The similar passage map is then used to train the SP machine learning model.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
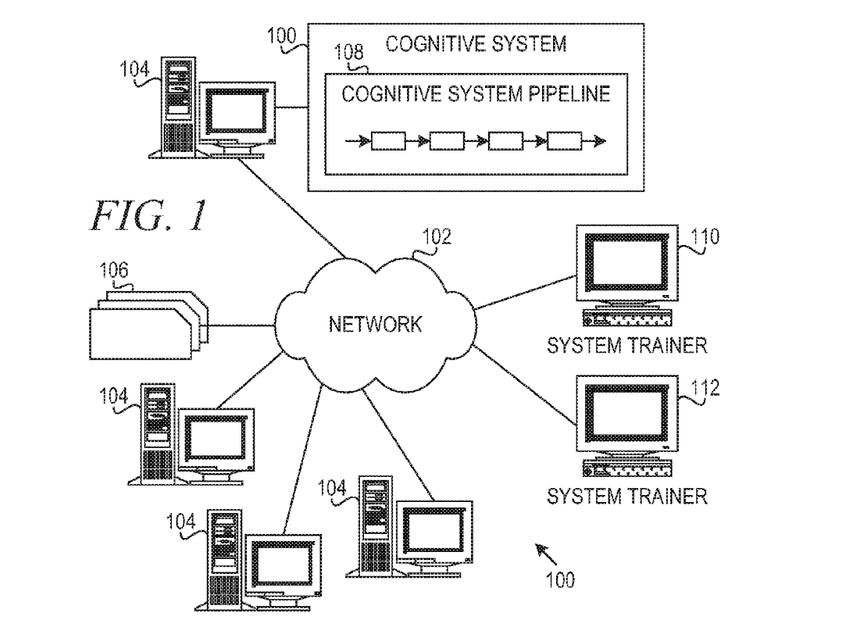
FIG. 1 depicts a schematic diagram of one illustrative embodiment of a cognitive system in a computer network.
Figure 2:
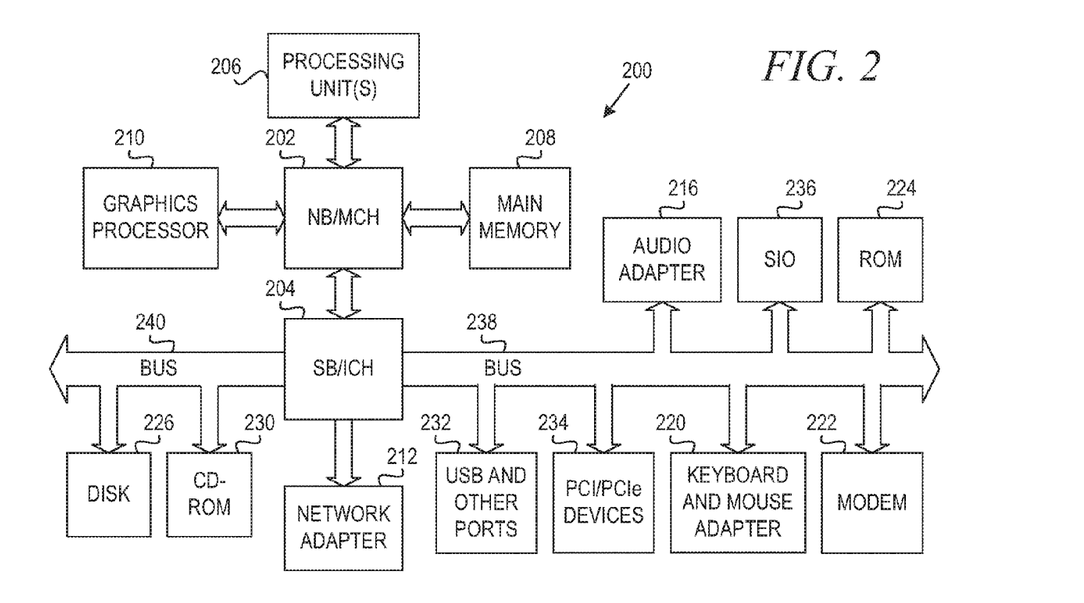
FIG. 2 is a block diagram of an example data processing system in which aspects of the illustrative embodiments are implemented.
Figure 3:
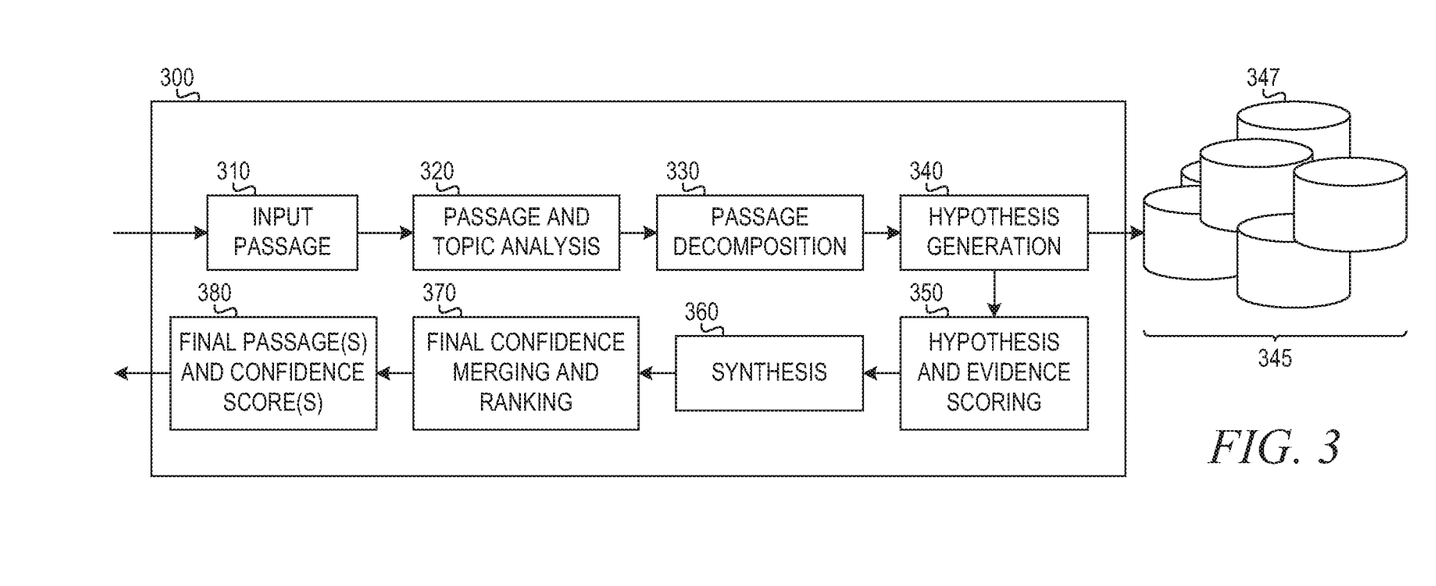
FIG. 3 illustrates a similar passage system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system, such as a Similar Passage (SP) system, methodology, and computer program product with which the mechanisms of the illustrative embodiments are implemented. As will be discussed in greater detail hereafter, the illustrative embodiments are integrated in, augment, and extend the functionality of these cognitive mechanisms with regard to training a similar passage system using a ground truth answer key from a question answering cognitive system.

Thus, it is important to first have an understanding of how a similar passage cognitive system is implemented before describing how the mechanisms of the illustrative embodiments are integrated in and augment such cognitive systems. It should be appreciated that the cognitive mechanisms described in FIGS. 1-3 are only examples and are not intended to state or imply any limitation with regard to the type of cognitive mechanisms with which the illustrative embodiments are implemented. Many modifications to the example cognitive system shown in FIGS. 1-3 may be implemented in various embodiments of the present invention without departing from the spirit and scope of the present invention.

As an overview, a Similar Passage cognitive system (SP system) is an artificial intelligence application executing on data processing hardware that provides similar passages of natural language content to a given natural language passage in a given subject-matter domain presented in natural language. The SP system is a cognitive system operating in accordance with an SP machine learning model. The SP system receives inputs from various sources including input over a network, a corpus of information in the form of electronic documents or other data, data from a content creator, information from one or more content users, and other such inputs from other possible sources of input. Data storage devices store the corpus of information. A content creator creates content in a document for use as part of a corpus of information with the SP system. The document may include any file, text, article, or source of data for use in the SP system. For example, an SP system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input passages to the SP system which then provides output passages that are similar to the input passages using the content in the corpus of information by evaluating documents, sections of documents, portions of data in the corpus, or the like. When a process evaluates a given section of a document for semantic content, the process can use a variety of conventions to query such document from the SP system, e.g., sending the query to the SP system as a well-formed passage, which is then interpreted by the SP system and a response is provided containing one or more similar output passages. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the SP system receives an input passage, parses the passage to extract the major features of the passage, uses the extracted features to formulate queries, and then applies those queries to the corpus of information. Based on the application of the queries to the corpus of information, the SP system generates a set of hypotheses, or candidate passages similar to the input passage, by looking across the corpus of information for portions of the corpus of information that have some potential for containing a valuable response to the input passage. The SP system then performs deep analysis on the language of the input passage and the language used in each of the portions of the corpus of information found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input passage and the found portions of the corpus of information. Other reasoning algorithms may look at temporal or spatial features in the language, while others may evaluate the source of the portion of the corpus of information and evaluate its veracity.

The scores obtained from the various reasoning algorithms indicate the extent to which the potential response is inferred by the input passage based on the specific area of focus of that reasoning algorithm. Each resulting score is then weighted against a statistical model. The statistical model captures how well the reasoning algorithm performed at establishing the inference between two similar passages for a particular domain during the training period of the SP system. The statistical model is used to summarize a level of confidence that the SP system has regarding the evidence that the potential response, i.e. a candidate passage, is inferred by the input passage. This process is repeated for each of the candidate passages until the SP system identifies candidate passages that surface as being significantly stronger than others and, thus, generates a final response, or ranked set of output passages, for the input passage.

As mentioned above, SP systems and mechanisms operate by accessing information from a corpus of information (also referred to as a corpus of content), analyzing it, and then generating results based on the analysis of this data. Accessing content from a corpus of information typically includes a search that delivers a collection of document links in response to a query against a collection of unstructured data (text, markup language, etc.).

Operating on such content, the SP system generates responses for input passages using a plurality of intensive analysis mechanisms, which evaluate the content to identify the most probable passages, i.e. candidate passages that are determined to be similar to the input passage. The most probable candidate passages are output as a ranked listing of similar passages, ranked according to their relative confidence scores calculated during evaluation of the candidate passages, as a single final passage having a highest ranking confidence score, or a combination of ranked listing and final response. Typically, alongside each returned similar passage, the confidence score of that similar passage is also provided.

FIG. 1 depicts a schematic diagram of one illustrative embodiment of a similar passage (SP) system 100 in a computer network 102. The SP system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The SP system 100 and network 102 enables functionality for one or more SP system trainers via their respective computing devices 110-112. Other embodiments of the SP system 100 may be used with components, systems, sub-systems, and/or devices other than those that are depicted herein.

The SP system 100 is configured to implement an SP system pipeline 108 that receive inputs from various sources. For example, the SP system 100 receives input from the network 102, a corpus of information 106, SP system trainers, and/or other data and other possible sources of input. In one embodiment, some or all of the inputs to the SP system 100 are routed through the network 102. The various computing devices 104 on the network 102 include access points for content creators and SP system trainers or subject matter experts (SMEs). Some of the computing devices 104 include devices for a search index, content repository or database storing the corpus of information 106 (which is shown as a separate entity in FIG. 1 for illustrative purposes only). Portions of the corpus of information 106 may also be provided on one or more other network attached storage devices, in one or more search indexes, content repositories or databases, or other computing devices not explicitly shown in FIG. 1. The network 102 includes local network connections and remote connections in various embodiments, such that the SP system 100 may operate in environments of any size, including local and global, e.g., the Internet.

In one embodiment, the content creator creates content in a document of the corpus of information 106 for use as part of a corpus of information with the SP system 100. The document includes any file, text, article, or source of data for use in the SP system 100. SP system trainers access the SP system 100 via a network connection or an Internet connection to the network 102, and input passages to the SP system 100 that have similar passages in the content in the corpus of information 106. The SP system 100 parses and interprets the passages, and provides a response to the SP system trainer, e.g., SP system trainer 110, containing one or more passages similar to the input passage. In some embodiments, the SP system 100 provides a response to SP system trainers in a ranked list of similar passages, ranked according to their relative confidence scores calculated during evaluation of the candidate passages, while in other illustrative embodiments, the SP system 100 provides a single final passage having the highest ranking confidence score, or a combination of a final response and ranked listing.

The SP system 100 implements an SP system pipeline 108, which comprises a plurality of stages for processing an input passage and the corpus of information 106. The SP system pipeline 108 generates similar passages for the input passage based on the processing of the input passage and the corpus of information 106. The SP system pipeline 108 will be described in greater detail hereafter with regard to FIG. 3.

In some illustrative embodiments, the SP system 100 may be based on the IBM Watson™ QA system available from International Business Machines Corporation of Armonk, N.Y., which is augmented with the mechanisms of the illustrative embodiments described hereafter. The IBM Watson™ QA system receives an input question which it then parses to extract the major features of the question, which in turn are then used to formulate queries that are applied to the corpus of information. Based on the application of the queries to the corpus of information, a set of hypotheses, or candidate answers to the input question, are generated by looking across the corpus of information for portions of the corpus of information that have some potential for containing a valuable response to the input question. The IBM Watson™ QA system then performs deep analysis on the language of the input question and the language used in each of the portions of the corpus of information found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

For a question answering (QA) system, an answer could be a passage of text from a document in the corpus, or an answer could be a distinct information particle that is supported by one or more passages of text from documents in the corpus. A question and answer key is a list of pairs, each consisting of a question and a list of answer indicators. Each answer indicator could directly specify a particular passage of a document in the corpus that is an answer to a question, or it could indirectly specify a pattern that is used to identify passages from documents in the corpus that are answers to a question. An example of a direct answer indicator is a document passage identifier, optionally further qualified by a numeric offset and length of a span of text within the passage that gives the answer more precisely. An example of an indirect answer indicator is a regular expression that may match zero, one, or many passages in documents of the corpus, optionally qualified by a secondary span indicator or perhaps a second regular expression that helps to isolate a more precise answer within a given passage. As a third alternative, an answer indicator could express a factoid answer in which the answer is characterized by a text string or a pattern, and the passages from corpus documents that support the answer are characterized by a list of direct references or indirect patterns.

As used herein, the term "ground truth" refers to one or more question and answer keys used for training and testing a question answering (QA) system. Typically, the questions in the training answer key are distinct from the test answer key. While the training set questions may be distinct from the test set questions, the answer indicators may not be, because the same passage may provide an answer, or evidence for an answer, for more than one question.

Training a machine learning model for a cognitive system, such as a QA system, involves the use of multiple linguistic scorers that rate how a given passage relates to a given question. A simple example of a scorer is one that assigns a score to a passage proportional to the number of words that it has in common with a given question, optionally ignoring words from a list of words known to be unimportant. For each question in the training set, a set of passages from the corpus is obtained and each is scored, relative to the question, with each of K linguistic scorers. One additional score is computed for each passage: whether or not the passage is deemed to be an answer for the question based on analyzing the passage with the question's answer indicator list. A passage is "in the ground truth" for a question if it is matched by the question's answer indicator. In this way, for each question, each passage from the set of passages analyzed becomes a (K+1)-valued data point. One machine learning mechanism for training, then, consists of determining the (K+1)-variable logistic regression model of best fit for the passage data points.

FIG. 2 is a block diagram of an example data processing system in which aspects of the illustrative embodiments of an SP system 100 and SP system pipeline 108 are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements an SP system 100 and SP system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM®eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates an SP system pipeline for processing an input passage in accordance with one illustrative embodiment. The SP system pipeline of FIG. 3 may be implemented, for example, as SP system pipeline 108 of SP system 100 in FIG. 1. It should be appreciated that the stages of the SP system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The SP system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the SP system pipeline 300 comprises a plurality of stages 310-380 through which the SP system operates to analyze an input passage and generate a final response. In an initial passage input stage 310, the SP system receives an input passage that is presented in a natural language format. That is, a user inputs, via a user interface, an input passage for which the user wishes to obtain a similar passage. In response to receiving the input passage, the next stage of the SP system pipeline 300, i.e. the passage and topic analysis stage 320, parses the input passage using natural language processing (NLP) techniques to extract major features from the input passage, and classify the major features according to types, e.g., names, dates, or any of a plethora of other defined topics.

Referring again to FIG. 3, the identified major features are then used during the passage decomposition stage 330 to decompose the passage into one or more queries that are applied to the corpus of information 345 in order to generate one or more hypotheses. The queries are generated in any known or later developed search API, content repository API, or query language, such as Solr/Lucene, content management interoperability services (CMIS), the Structure Query Language (SQL), or the like. The queries are applied to one or more search indexes, content repositories or databases storing information about the electronic texts, documents, articles, websites, and the like, that make up the corpus of information 345. That is, these various sources themselves, different collections of sources, and the like, represent a different subordinate corpus 347 within the corpus of information 345. There may be different subordinate corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a subordinate corpus 347 within the corpus of information 345.

The queries are applied to one or more search indexes, content repositories or databases storing information about the electronic texts, documents, articles, websites, and the like, that make up the corpus of content, i.e., the corpus of information 106 in FIG. 1. The queries are applied to the corpus of information at the hypothesis generation stage 340 to generate results identifying potential hypotheses for providing similar passages for the input passage, which can then be evaluated. That is, the application of the queries results in the extraction of portions of the corpus of information matching the criteria of the particular query. These portions of the corpus are then analyzed and used, during the hypothesis generation stage 340, to generate hypotheses for providing passages similar to the input passage. These hypotheses are also referred to herein as candidate passages for the input passage. For any input passage, at this stage 340, there may be hundreds of hypotheses or candidate passages generated that may need to be evaluated.

The SP system pipeline 300, in stage 350, then performs a deep analysis and comparison of the language of the input question and the language of each hypothesis, as well as performs evidence scoring to evaluate the likelihood that the particular hypothesis is similar to the input passage. As mentioned above, this involves using a plurality of reasoning algorithms, each performing a separate type of analysis of the language of the input passage and/or content of the corpus that provides evidence in support of, or not in support of, the hypothesis. Each reasoning algorithm generates a score based on the analysis it performs which indicates a measure of relevance of the individual portions of the corpus of information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input passage or synonyms to that term in the input passage, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input passage.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the SP system and/or dynamically updated. For example, the weights for scores generated by algorithms that identify exactly matching terms and synonyms may be set relatively higher than other algorithms that are evaluating publication dates for evidence passages. The weights themselves may be specified by subject matter experts or learned through machine learning processes that evaluate the significance of characteristics evidence passages and their relative importance to overall candidate passage generation.

The weighted scores are processed in accordance with a statistical model generated through training of the SP system that identifies a manner by which these scores may be combined to generate a confidence score or measure for the individual hypotheses or candidate passages. This confidence score or measure summarizes the level of confidence that the SP system has about the evidence that the candidate passage is inferred by the input passage, i.e. that the candidate passage is similar to the input passage.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate passages are the most likely to be similar to the input passage. The hypotheses/candidate passages are ranked according to these comparisons to generate a ranked listing of hypotheses/candidate passages (hereafter simply referred to as "candidate passages"). From the ranked listing of candidate passages, at stage 380, a final similar passage and confidence score, or final set of similar passages and confidence scores, are generated and output to the submitter of the original input passage via a graphical user interface or other mechanism for outputting information.

Figure 4:
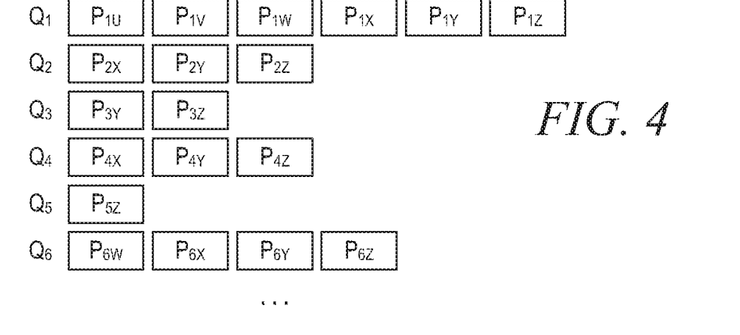
FIG. 4 illustrates an example of a question and passage list answer key in accordance with an illustrative embodiment.

In accordance with an illustrative embodiment, a SP system trainer uses the question and answer key for a question answering (QA) cognitive system to form a similar passage map for training a similar passage (SP) cognitive system 100. In the illustrative embodiment, the question and answer key takes the form of a question and passage list answer key. FIG. 4 illustrates an example of a question and passage list answer key for a question answering system in accordance with an illustrative embodiment. Each question has at least one associated passage from the corpus of information. However, the passage lists may have been derived from answer indicator lists that contain direct passage indicators, or they may have been derived from indirect passage characterizations, such as complex regular expressions.

Figure 5A:
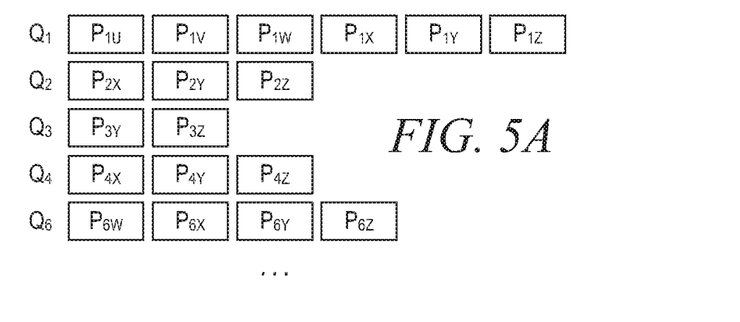
FIG. 5A shows a question and passage list answer key to be used as input to a process that creates a similar passage question to answer system training answer key in accordance with an illustrative embodiment.

In accordance with one illustrative embodiment, a mechanism converts the question and passage list answer key of the QA system, except for removing questions that have an empty answer indicator list, to the question and passage list format shown in FIG. 5A. The question and passage list format shown in FIG. 5A can be used as the similar passage map used in the training process that creates a similar passage question to answer (SP-QA) system in accordance with an illustrative embodiment (See FIGS. 6, 7).

Figure 5B:
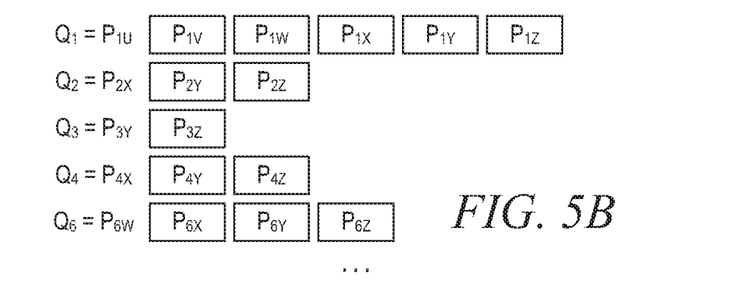
FIG. 5B shows an similar passage answer to answer training answer key that contains a passage as the question whose answer list is the remaining passages from the passage list for the same question in a question and passage list answer key in accordance with the illustrative embodiment.
Figure 5C:
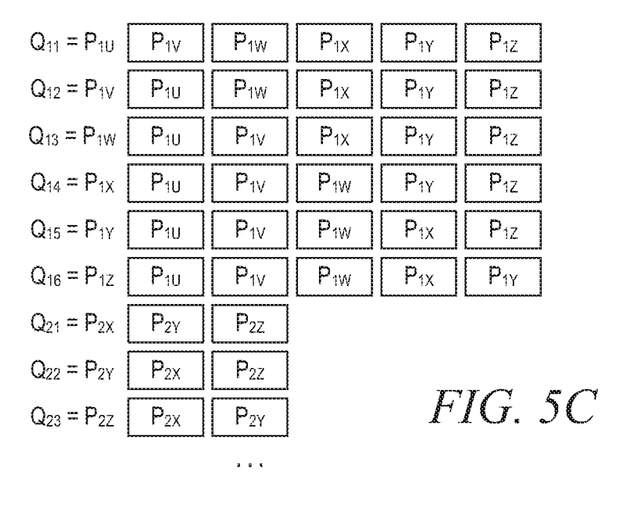
FIG. 5C shows a larger similar passage answer to answer training answer key in which each passage list from a question and passage list answer key is converted into multiple passage question/answer list pairs in accordance with the illustrative embodiment.

In accordance with another illustrative embodiment, a mechanism further converts the question and passage list format of FIG. 5A into a similar passage map shown in FIG. 5B or 5C. Due to the technique below for generating the similar passage map, questions are removed if the answer indicator list indicates fewer than two answer passages. The main concept is illustrated in FIG. 5B. The mechanism can make an entry in the similar passage map for each question in the question and passage list format of FIG. 5A. The mechanism may discard the question as the first passage in the passage list of length K becomes the sample input text component in an entry of the similar passage map. The corresponding sample output text list component comprises the other K−1 passages. The resulting similar passage map can be used in the training process that creates a similar passage answer to answer (SP-AA) system in accordance with the illustrative embodiment.

The illustrative embodiment is not limited to creating a single entry in the similar passage map for the SP-AA system per entry in the given question and passage list answer key. Instead, for any passage list of length K, the mechanism may make a total of K entries. Each successive entry would contain a successive one of the passages as the question, and the other K−1 passages would then form the passage answer list that is associated with that passage question. FIG. 5C shows a larger similar passage answer to answer training answer key in which each answer list is converted into multiple passage question/answer list pairs in accordance with the illustrative embodiment (See FIGS. 6, 8).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6A:
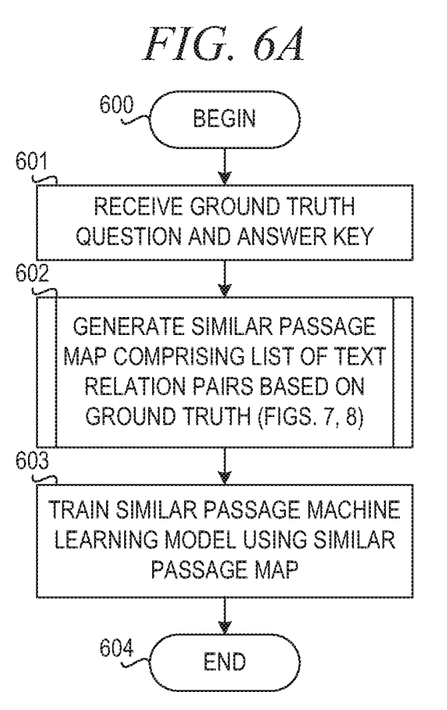
FIG. 6A is a flowchart illustrating operation of a mechanism for training a similar cognitive passage system in accordance with an illustrative embodiment.

FIG. 6A is a flowchart illustrating operation of a mechanism for training a similar passage cognitive system in accordance with an illustrative embodiment. Operation begins (block 600), and the mechanism receives a ground truth question and answer key (block 601) created by a subject matter expert (SME). The mechanism generates a similar passage map comprising a list of text relation pairs based on the ground truth question and answer key (block 602). Each text relation pair consists of a sample input text and a list of sample output text components. The sample input text represents a sample that exemplifies input text on which the similar passage cognitive system must be trained, and each sample output text represents a similar passage to the sample input text.

In alternative embodiments, the mechanism generates the similar passage map for a similar passage question to answer (SP-QA) machine learning model or a similar passage answer to answer (SP-AA) machine learning model. The SP-QA machine learning model is trained using questions as the sample input text components, and the sample output texts are the corresponding answer passages. The SP-AA machine learning model is trained using passages as the sample input text components with the sample output texts being the other answer passages that answer the same question in the ground truth question and answer key. The operation of generating the similar passage maps for the SP-QA and SP-AA embodiments are described in further detail below with reference to FIGS. 7 and 8, respectively.

The mechanism then trains a similar passage machine learning model using the similar passage map (block 603). The resulting similar passage system, which is a cognitive system operating in accordance with the similar passage machine learning model, can then be used by a user to find passages in a corpus that are similar to an input text. Thereafter, operation ends (block 604).

Figure 6B:
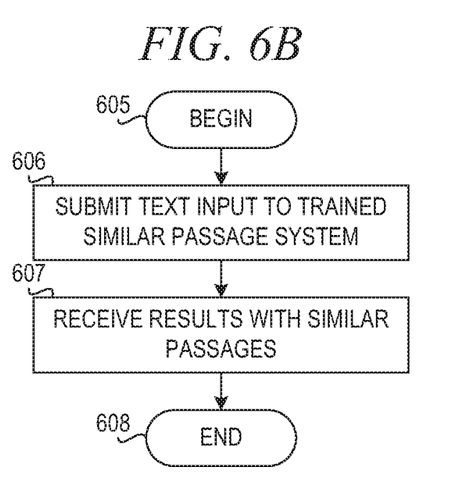
FIG. 6B is a flowchart illustrating operation of a mechanism for using a trained similar passage cognitive system in accordance with an illustrative embodiment.

FIG. 6B is a flowchart illustrating operation of a mechanism for using a trained similar passage cognitive system in accordance with an illustrative embodiment. Operation begins (block 605), and the mechanism submits a text input to the similar passage cognitive system operating in accordance with the trained similar passage model (block 606). The mechanism receives results containing passages that are similar to the text input (block 607). Thereafter, operation ends (block 608). Optionally, in one embodiment, the trained similar passage system can be used multiple times to help improve ground truth for a question answering cognitive system. In that embodiment, the mechanism sends the similar passages obtained in block 607 to a subject matter expert (SME), who selects the passages that should be used to improve the ground truth of the question answering cognitive system. Thereafter, the question answering cognitive system may be retrained with a ground truth that has been supplemented by selected results obtained from the trained similar passage cognitive system.

Figure 7:
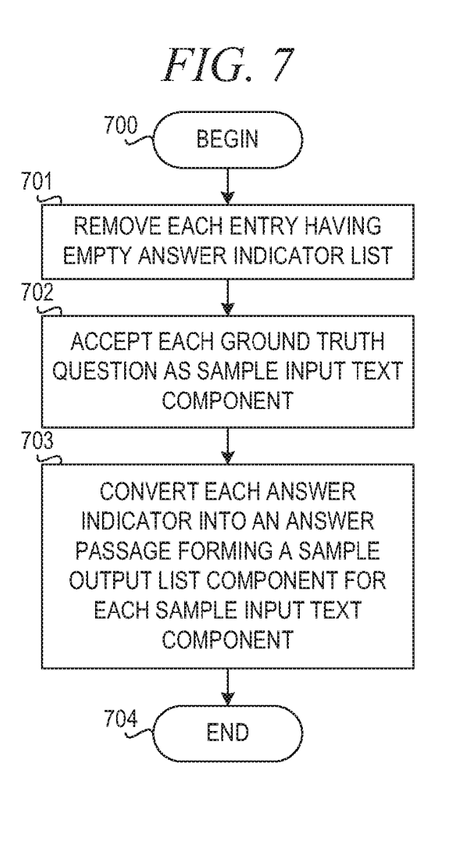
FIG. 7 is a flowchart illustrating operation of a mechanism for generating a similar passage map for a similar passage question to answer system in accordance with an illustrative embodiment.

FIG. 7 is a flowchart illustrating operation of a mechanism for generating a similar passage map for a similar passage question to answer system in accordance with an illustrative embodiment. Operation begins with receiving question and answer ground truth from an SME (block 700). The question and answer ground truth may take the form of a question and answer key comprising a list of question and answer specification pairs. Each question is a text string and each answer specification references one or more text passages from a corpus of information. For the purpose of discussion, an answer indicator list is a list of indicators of the one or more text passages referenced by the answer specification. In one embodiment, an answer specification is an answer indicator list. In an alternative embodiment, an answer specification expresses one or more patterns that determine answer passages from which an answer indicator list can be constructed. In another alternative embodiment, an answer specification is a list of pairs consisting of a factoid answer and an answer indicator list or an answer pattern list whose patterns match one or more text passages which support the association between the factoid answer and the question. In both of these alternative embodiments, the answer patterns can be converted to a direct answer indicator list by searching the corpus of information to obtain the indicators of the passages that the answer patterns match.

The mechanism removes each entry in the answer key having an empty answer indicator list (block 701). The mechanism accepts each ground truth question as a sample input text component for the similar passage map (block 702). The mechanism then converts each answer indicator into an answer passage to form a sample output text, resulting in a list of sample output text components for each sample input text in the similar passage map (block 703). In addition, for an answer key in which the answer indicators are in the form of regular expressions, the mechanism also converts the regular expression to one or more references to passages in the corpus. Thereafter, operation ends (block 704). The result is a similar passage map of the form illustrated by FIG. 5A.

Figure 8:
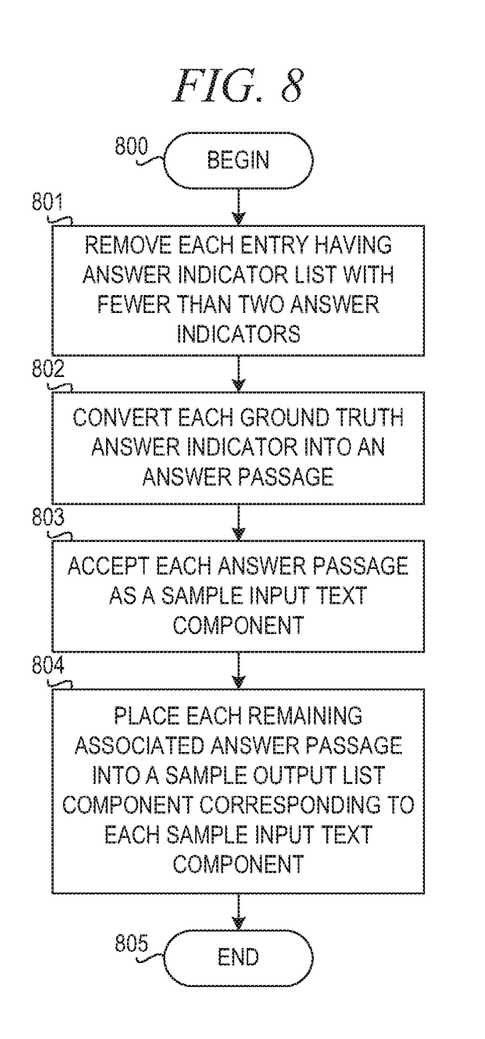
FIG. 8 is a flowchart illustrating operation of a mechanism for generating a similar passage map for a similar passage answer to answer system in accordance with an illustrative embodiment.

FIG. 8 is a flowchart illustrating operation of a mechanism for generating a similar passage map for a similar passage answer to answer system in accordance with an illustrative embodiment. Operation begins with receiving question and answer ground truth from an SME (block 800). The question and answer ground truth may take the form of an answer key comprising a list of question and answer specification pairs. Each question is a text string and each answer specification references one or more text passages from a corpus of information. For the purpose of discussion, an answer indicator list is a list of indicators of the one or more text passages referenced by the answer specification. In one embodiment, an answer specification is an answer indicator list. In an alternative embodiment, an answer specification expresses one or more patterns that determine answer passages from which an answer indicator list can be constructed. In another alternative embodiment, an answer specification is a list of pairs consisting of a factoid answer and an answer indicator list or an answer pattern list whose patterns match one or more text passages which support the association between the factoid answer and the question. In both of these alternative embodiments, the answer patterns can be converted to a direct answer indicator list by searching the corpus of information to obtain the indicators of the passages that the answer patterns match.

The mechanism removes each entry in the answer key having an answer indicator list with fewer than two answer indicators (block 801). The mechanism converts each ground truth answer indicator into an answer passage (block 802) and accepts each answer passage as a sample input text component (block 803). The mechanism then places each remaining associated answer passage into the sample output list component corresponding to each sample input text component (block 804). Thereafter, operation ends (block 805). The result is a similar passage map of the form illustrated by FIG. 5B or 5C.

In both mechanisms expressed above for generating a similar passage map, there is a required minimum size for the answer indicator list associated with a question. In block 701, the question and answer indicator list are removed if the answer indicator list is empty. In block 801, the question and answer indicator list are removed if the answer indicator list contains fewer than two answer indicators. In an alternative embodiment, the ground truth entries that do not meet a threshold requirement for the size of the answer indicator list are gathered. The questions of those ground truth entries are presented to a user who, as a subject matter expert, can use knowledge of the corpus of information to find and provide enough references to text passage answers to meet the minimum threshold. Once the answer indicator lists of questions are expanded in this way, the containing ground truth entries are able to be used to generate an improved similar passage map as they are no longer removed by block 701 or block 801.

In the illustrative embodiment, the first step of the mechanism receives a ground truth question and answer key from a question answering cognitive system. It is common practice for the ground truth of a question answering cognitive system to be divided into more than one set of questions with their associated answer specifications, i.e. ground truth would typically be divided into more than one question and answer key. For example, one set may be used for training the question answering cognitive system and a second set may be used as an independent test of the efficacy of the question answering cognitive system. In an alternative embodiment of the present invention, the multiple question and answer keys within the ground truth of the question answering cognitive system are combined into one question and answer key for the purpose of determining the input.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and a memory comprising instructions which, when executed by the at least one processor, causes the at least one processor to train a similar passage cognitive system, the method comprising:

receiving a question and answer key for a question answering cognitive system, the question and answer key comprising a list of question and answer specification pairs, wherein each question is a text string and each answer specification references one or more text passages from a corpus of information;

using the question and answer key to generate a similar passage map for the similar passage cognitive system, the similar passage map comprising a list of text relation pairs, wherein each text relation pair comprises a sample input text component and a list comprising one or more sample output text components;

training a similar passage machine learning model of the similar passage cognitive system using the similar passage map; and sending at least one text input to the similar passage cognitive system operating in accordance with the similar passage machine learning model, and receiving from the similar passage cognitive system a response list of references to text passages from the corpus of information.

2. The method of claim 1, wherein:

the sample input text component of each text relation pair in the similar passage map is generated using a question text string from the question and answer key; and each sample output text component of each text relation pair in the similar passage map is generated using a text passage reference from the answer specification in the question and answer key corresponding to the question text string used to generate the sample input text component of the text relation pair.

3. The method of claim 1, wherein:

the sample input text component of each text relation pair in the similar passage map is generated using a first text passage reference from the answer specification in the question and answer key corresponding to a question text; and the sample output text component of each text relation pair in the similar passage map is generated using a second text passage reference from the answer specification used to generate the sample input text component of the text relation pair.

4. The method of claim 1, further comprising:
receiving a question and answer pattern key comprising a list of question and answer pattern pairs;
converting the question and answer pattern key to the question and answer key by resolving each answer pattern to an answer specification comprising a list of references to one or more text passages that match the answer pattern from the corpus of information; and
using the converted question and answer key as the received question and answer key.

5. The method of claim 1, further comprising:
receiving a factoid question and answer key comprising a list of question and factoid answer specification pairs;
converting the factoid question and answer key to the question and answer key by resolving each factoid answer specification to an answer specification comprising a list of references to one or more text passages from the corpus of information; and
using the converted question and answer key as the received question and answer key.

6. The method of claim 1, further comprising:
determining a question and answer specification pair for which the number of text passage references in the answer specification is less than a threshold value;
prompting a user to provide at least one additional text passage reference; and
amending the answer specification to include the at least one additional text passage reference.

7. The method of claim 1, further comprising:
receiving a training set question and answer key for the question answering cognitive system;
receiving a test set question and answer key for the question answering cognitive system;
combining the training set question and answer key and the test set question and answer key into a combined question and answer key; and
using the combined question and answer key as the received question and answer key.

8. A computer program product comprising a non-transitory computer readable storage medium having a computer readable program stored therein, wherein the computer readable program, when executed on a computing device, causes the computing device to train a similar passage cognitive system, wherein the computer readable program causes the computing device to:
receive a question and answer key for a question answering cognitive system, the question and answer key comprising a list of question and answer specification pairs, wherein each question is a text string and each answer specification references one or more text passages from a corpus of information;
using the question and answer key to generate a similar passage map for the similar passage cognitive system, the similar passage map comprising a list of text relation pairs, wherein each text relation pair comprises a sample input text component and a list comprising one or more sample output text components;
train a similar passage machine learning model of the similar passage cognitive system using the similar passage map; and
send at least one text input to the similar passage cognitive system operating in accordance with the similar passage machine learning model, and receive from the similar passage cognitive system a response list of references to text passages from the corpus of information.

9. The computer program product of claim 8, wherein:
the sample input text component of each text relation pair in the similar passage map is generated using a question text string from the question and answer key; and
each sample output text component of each text relation pair in the similar passage map is generated using a text passage reference from the answer specification in the question and answer key corresponding to the question text string used to generate the sample input text component of the text relation pair.

10. The computer program product of claim 8, wherein:
the sample input text component of each text relation pair in the similar passage map is generated using a first text passage reference from the answer specification in the question and answer key corresponding to a question text; and
the sample output text component of each text relation pair in the similar passage map is generated using a second text passage reference from the answer specification used to generate the sample input text component of the text relation pair.

11. The computer program product of claim 8, wherein the computer readable program further causes the computing device to:
receive a question and answer pattern key comprising a list of question and answer pattern pairs;
convert the question and answer pattern key to the question and answer key by resolving each answer pattern to an answer specification comprising a list of references to one or more text passages that match the answer pattern from the corpus of information; and
use the converted question and answer key as the received question and answer key.

12. The computer program product of claim 8, wherein the computer readable program further causes the computing device to:
receive a factoid question and answer key comprising a list of question and factoid answer specification pairs;
convert the factoid question and answer key to a question and answer key by resolving each factoid answer specification to an answer specification comprising a list of references to one or more text passages from the corpus of information; and
use the converted question and answer key as the received question and answer key.

13. The computer program product of claim 8, wherein the computer readable program further causes the computing device to:
determine a question and answer specification pair for which the number of text passage references in the answer specification is less than a threshold value;
prompt a user to provide at least one additional text passage reference; and
amend the answer specification to include the at least one additional text passage reference.

14. The computer program product of claim 8, wherein the computer readable program further causes the computing device to:
receive a training set question and answer key for the question answering cognitive system;
receive a test set question and answer key for the question answering cognitive system;

combine the training set question and answer key and the test set question and answer key into a combined question and answer key; and use the combined question and answer key as the received question and answer key.

15. An apparatus comprising:

a processor; and a memory coupled to the processor, wherein the memory comprises instructions which, when executed by the processor, cause the processor to implement a similar passage cognitive system, wherein the instructions causes the processor to:

receive a question and answer key for a question answering cognitive system, the question and answer key comprising a list of question and answer specification pairs, wherein each question is a text string and each answer specification references one or more text passages from a corpus of information;

using the question and answer key to generate a similar passage map for the similar passage cognitive system, the similar passage map comprising a list of text relation pairs, wherein each text relation pair comprises a sample input text component and a list comprising one or more sample output text components;

train a similar passage machine learning model of the similar passage cognitive system using the similar passage map;

send at least one text input to the similar passage cognitive system operating in accordance with the similar passage machine learning model, and receive from the similar passage cognitive system a response list of references to text passages from the corpus of information.

16. The apparatus of claim 15, wherein:

the sample input text component of each text relation pair in the similar passage map is generated using a question text string from the question and answer key; and each sample output text component of each text relation pair in the similar passage map is generated using a text passage reference from the answer specification in the question and answer key corresponding to the question text string used to generate the sample input text component of the text relation pair.

17. The apparatus of claim 15, wherein:

the sample input text component of each text relation pair in the similar passage map is generated using a first text passage reference from the answer specification in the question and answer key corresponding to a question text; and the sample output text component of each text relation pair in the similar passage map is generated using a second text passage reference from the answer specification used to generate the sample input text component of the text relation pair.

18. The apparatus of claim 15, wherein the instructions further cause the processor to:

receive a question and answer pattern key comprising a list of question and answer pattern pairs;

convert the question and answer pattern key to the question and answer key by resolving each answer pattern to an answer specification comprising a list of references to one or more text passages that match the answer pattern from the corpus of information; and use the converted question and answer key as the received question and answer key.

19. The apparatus of claim 15, wherein the instructions further cause the processor to:

receive a factoid question and answer key comprising a list of question and factoid answer specification pairs;

convert the factoid question and answer key to a question and answer key by resolving each factoid answer specification to an answer specification comprising a list of references to one or more text passages from the corpus of information; and use the converted question and answer key as the received question and answer key.

20. The apparatus of claim 15, wherein the instructions further cause the processor to:

determine a question and answer specification pair for which the number of text passage references in the answer specification is less than a threshold value;

prompt a user to provide at least one additional text passage reference; and amend the answer specification to include the at least one additional text passage reference.

21. The apparatus of claim 15, wherein the instructions further cause the processor to:

receive a training set question and answer key for the question answering cognitive system;

receive a test set question and answer key for the question answering cognitive system;

combine the training set question and answer key and the test set question and answer key into a combined question and answer key; and use the combined question and answer key as the received question and answer key.

* * * * *